(12) United States Patent
Yoshimine et al.

(10) Patent No.: US 8,227,119 B2
(45) Date of Patent: Jul. 24, 2012

(54) FUEL CELL SYSTEM

(75) Inventors: Yuki Yoshimine, Wako (JP); Jun Yamamoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/259,959

(22) PCT Filed: Feb. 15, 2010

(86) PCT No.: PCT/JP2010/052136
§ 371 (c)(1),
(2), (4) Date: Sep. 23, 2011

(87) PCT Pub. No.: WO2010/113548
PCT Pub. Date: Oct. 7, 2010

(65) Prior Publication Data
US 2012/0015260 A1 Jan. 19, 2012

(30) Foreign Application Priority Data
Mar. 31, 2009 (JP) ................................ 2009-088171

(51) Int. Cl.
*H01M 8/06* (2006.01)
*H01M 8/04* (2006.01)
*H01M 8/12* (2006.01)

(52) U.S. Cl. ........ 429/414; 429/413; 429/423; 429/428; 429/495

(58) Field of Classification Search ........................ None
See application file for complete search history.

(56) References Cited

U.S. PATENT DOCUMENTS

| 7,442,461 B2 * | 10/2008 | Goebel et al. ............. 429/415 |
| 2004/0191585 A1 * | 9/2004 | Morita .......................... 429/13 |
| 2008/0280176 A1 * | 11/2008 | Fukuda ......................... 429/23 |
| 2010/0203404 A1 | 8/2010 | Miyazaki |

FOREIGN PATENT DOCUMENTS

| JP | 54-165934 | 11/1979 |
| JP | 2000-65280 | 3/2000 |
| JP | 2003-132920 | 5/2003 |
| JP | 2005-235586 | 9/2005 |
| JP | 2006-236598 | 9/2006 |
| JP | 2007-234374 | 9/2007 |
| JP | 2008-300058 | 12/2008 |
| JP | 2009-37867 | 2/2009 |
| JP | 2009-37871 | 2/2009 |

OTHER PUBLICATIONS

International Search Report for Application No. PCT/JP2010/052136, dated May 18, 2010.

* cited by examiner

*Primary Examiner* — John S Maples
(74) *Attorney, Agent, or Firm* — Nelson Mullins Riley & Scarborough LLP; Anthony A. Laurentano

(57) ABSTRACT

A fuel cell system provided with a fuel cell module, a water supply device for supplying water to the fuel cell module, a water container for supplying water to the water supply device, and a condenser for condensing water vapor in the exhaust gas which is discharged from the fuel cell module and supplying the condensed water to the water container. The water container contains therein an ion exchange device for removing impurities which are contained in the water supplied from the condenser. The water supply device is provided below and downstream of the water container. A pressure regulating device for absorbing a pulsation of the water supply device and absorbing the variation in the pressure in the fuel cell module is provided between the water supply device and the fuel cell module.

9 Claims, 11 Drawing Sheets

FUEL CELL SYSTEM

RELATED APPLICATIONS

This application is a 35 U.S.C. 371 national stage filing of International Application No. PCT/JP2010/052136 filed Feb. 15, 2010, which claims priority to Japanese Patent Application No. 2009-088171 filed on Mar. 31, 2009 in Japan. The contents of the aforementioned applications are hereby incorporated by reference.

TECHNICAL FIELD

The present invention relates to a fuel cell system including a fuel cell module, a water supply apparatus, a water container, and a condenser.

BACKGROUND ART

Typically, a solid oxide fuel cell (SOFC) employs an electrolyte of ion-conductive solid oxide such as stabilized zirconia. The electrolyte is interposed between an anode and a cathode to form an electrolyte electrode assembly. The electrolyte electrode assembly is interposed between separators (bipolar plates). In use, normally, predetermined numbers of the electrolyte electrode assemblies and the separators are stacked together to form a fuel cell stack.

As the fuel gas supplied to the fuel cell, normally, a hydrogen gas generated from hydrocarbon raw material by a reformer is used. In general, in the reformer, a reformed raw material gas is obtained from hydrocarbon raw material of a fossil fuel or the like, such as methane or LNG, and then the reformed raw material gas undergoes steam reforming to produce a reformed gas (fuel gas).

In the steam reforming, water in the amount corresponding to the amount of water vapor used in reforming reaction needs to be supplied. In this regard, instead of the system of supplying the required amount of water from the outside, a water collection system where the exhaust gas produced in power generation of the fuel cell is condensed to achieve perfect circulation (water self-sustaining operation) of the water required for reforming is drawing attention.

For example, in a water collection apparatus of a fuel cell power generator apparatus disclosed in Japanese Laid-Open Patent Publication No. 2006-236598, as shown in FIG. 9, a fuel cell module 3a containing a fuel cell stack 1a and a reformer 2a is provided. Water vapor in the exhaust gas discharged from this fuel cell module 3a is condensed into water by a condenser including a heat collection apparatus 4a and a natural cooling unit 5a, and the condensed water is supplied to the fuel cell module 3a.

On the downstream side of the condenser, a water tank 6a for collecting water is provided. The water tank 6a supplies water to the fuel cell module 3a utilizing internal water pressure.

Further, in a fuel cell apparatus disclosed in Japanese Laid-Open Patent Publication No. 2008-300058, as shown in FIG. 10, a condensed water tank 1b is provided for storing condensed water produced by heat exchange in a heat exchanger (not shown). A lower end of the condensed water tank 1b is connected to an end of a condensed water supply pipe 2b, and the condensed water supply pipe 2b is connected to the heat exchanger. An upper end of the condensed water tank 1b is connected to a water tank 4b through a tank coupling pipe 3b. As means for processing the condensed water, for example, ion exchanger resin 5b is provided in the condensed water tank 1b.

Further, as shown in FIG. 11, a waste heat collection system in a solid oxide fuel cell disclosed in Japanese Laid-Open Patent Publication No. 2007-234374 includes a power generation module 4c and a heat exchanger 7c for waste heat collection. In the power generation module 4c, a solid oxide fuel cell 1c and a reformer 2c are provided in a power generation chamber 3c. The exhaust gas discharged from the power generation chamber 3c flows into an internal space 5c, and a circulation water pipe 6c extends through the internal space 5c.

An outlet port of the condensed water is provided on a lower surface of the heat exchanger 7c for waste heat collection, and a water storage tank 8c is provided at the outlet port of the condensed water. The water stored in the water storage tank 8c is supplied to the reformer 2c of the power generation module 4c of a water pump 9c.

SUMMARY OF INVENTION

However, in Japanese Laid-Open Patent Publication No. 2006-236598, the flow rate of the water supplied to the fuel cell module 3a is controlled only by the water pressure (hydraulic head pressure) of the water tank 6a. Therefore, for example, at the time of starting operation, at the time when the load is applied partially, at the time of tracking the load, or at the time of stopping operation, responsiveness is low.

Further, if a difference in the pressure loss is present in the system due to, e.g., power generation over a long period of time, the flow rate of water supplied to the fuel cell module 3a is changed. Therefore, it becomes difficult to maintain the optimum S/C (steam/carbon) ratio.

Further, in order to utilize the hydraulic head pressure, the water tank 6a needs to be provided on a side or above the fuel cell module 3a. Therefore, the layout of the entire system cannot be determined freely. Further, when water leakage occurs in the water tank 6a, the other facilities may be affected adversely.

Further, in Japanese Laid-Open Patent Publication No. 2008-300058, since two tanks, i.e., the condensed water tank 1b and the water tank 4b are used, the number of components is increased, and the production cost is high.

Moreover, in the condensed water tank 1b containing the ion exchanger resin 5b, the processed water is supplied to the water tank 4b through the tank coupling pipe 3b provided at the upper position of the condensed water tank 1b. Thus, for example, dust or the like floating in the condensed water tank 1b may move to, and enter the water tank 4b undesirably.

Further, the water processed by the ion exchanger resin 5b is stored in the water tank 4b. In the structure, in particular, in the case where the water is stored in the water tank 4b for a long period of time, impurities tend to be mixed into the water tank 4b easily, and the impurities may enter the reformer undesirably. Thus, in practical, it is required to avoid elution of impurities, and selection of material used for the water tank 4b is limited.

Further, in Japanese Laid-Open Patent Publication No. 2007-234374, the water stored in the water storage tank 8c is directly supplied to the reformer 2c through the water pump 9c. Thus, for example, if pulsation occurs in the water pump 9c, water is not supplied to the power generation module 4c stably. In particular, in the case where a plunger pump (or a piston pump) is used as the water pump 9c, influence due to pulsation of this type is large.

Further, when the pressure in the power generation module 4c is increased, or when a failure occurs in the water pump 9c, backflow of the fuel gas from the power generation module 4c may occur undesirably.

The present invention has been made to solve the problems of this type, and an object of the present invention is to provide a fuel cell system having simple and compact structure in which air entrainment in a water supply apparatus is prevented as much as possible and it is possible to absorb pulsation in the water supply apparatus, and pressure changes in the fuel cell module.

The present invention relates to a fuel cell system including a fuel cell module, a water supply apparatus, a water container, and a condenser. The fuel cell module generates electrical energy by electrochemical reactions of a fuel gas and an oxygen-containing gas, the water supply apparatus supplies water to the fuel cell module, the water container supplies water to the water supply apparatus, and the condenser condenses water vapor in an exhaust gas discharged from the fuel cell module, and supplies the condensed water to the water container.

The water container contains an ion exchanger apparatus for removing impurities in the water supplied from the condenser, the water supply apparatus is provided below the water container, and downstream of the water container, and a pressure regulator is provided between the water supply apparatus and the fuel cell module, for absorbing pulsation of the water supply apparatus and absorbing pressure changes in the fuel cell module.

In the present invention, the ion exchanger apparatus is provided in the water container, and the water container and the ion exchanger apparatus are provided together. Thus, the water container and the ion exchanger apparatus have simple and compact structure as a whole. Further, since the ion exchanger apparatus is provided in the water container, material used for the water container is not limited, and selection of material used for the water container can be determined freely.

Further, the water supply apparatus is provided below the water container, and downstream of the water container. Thus, since water is supplied from the water container to the water supply apparatus by the hydraulic head pressure, occurrence of air entrainment in the water supply apparatus is prevented as much as possible. In the structure, it is possible to effectively avoid degradation in the performance of the water supply apparatus, mixture of the air into the reformer, deposition (coking) of carbon at the anode, and instability of power generation voltage of the fuel cell module.

Further, the ion exchanger apparatus in the water container is provided upstream of the water supply apparatus. Therefore, high pressure (water pressure) by the water supply apparatus is not applied to the ion exchanger apparatus. Thus, improvement in the durability and product life of the ion exchanger apparatus is achieved.

Further, the pressure regulator is provided between the water supply apparatus and the fuel cell module. Therefore, since pulsation of the water supply apparatus is absorbed by the pressure regulator, it is desirable that the present invention is applied to the water supply apparatus having large pulsation. In particular, in the case where a plunger pump (or a piston pump) is used as the water supply apparatus, even at the time when water is not pushed out, the water in the pressure regulator can be supplied to the downstream side.

Thus, it becomes possible to supply the water to the fuel cell module stably. Further, shortage of water vapor supplied to the reformer, deposition (coking) of carbon at the electrode, and instability of power generation output in the fuel cell module can be avoided effectively.

Further, the pressure regulator absorbs the change in the pressure of the fuel cell module. Therefore, no excessive pressure is applied to the water supply apparatus, and improvement in the durability of the water supply apparatus is achieved. Further, at the time when the pressure in the fuel cell module is increased, or when a failure occurs in the water supply apparatus, the influence due to the backflow of the fuel gas from the fuel cell module, e.g., gas leakage can be suppressed.

DESCRIPTION OF EMBODIMENTS

A fuel cell system 10 according to a first embodiment of the present invention is used in various applications, including stationary and mobile applications. For example, the fuel cell system 10 is mounted on a vehicle.

Figure 1:
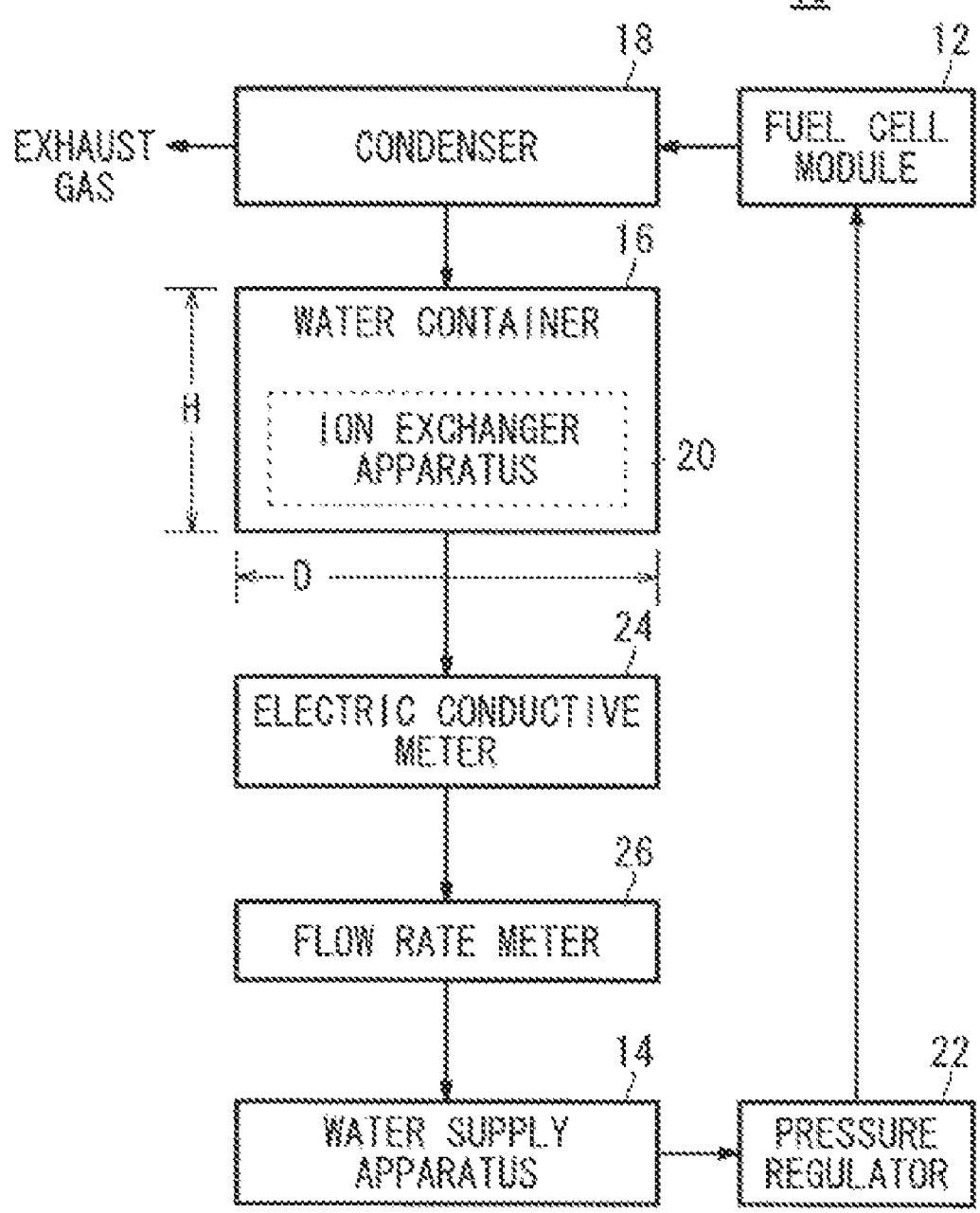
FIG. 1 is a diagram schematically showing structure of a fuel cell system according to a first embodiment of the present invention.

As schematically shown in FIG. 1, the fuel cell system 10 includes a fuel cell module 12 for generating electrical energy in power generation by electrochemical reactions of a fuel gas (hydrogen gas) and an oxygen-containing gas (air), a water supply apparatus (including a water pump) 14 for supplying water to the fuel cell module 12, a water container 16 for supplying water to the water supply apparatus 14, and a condenser (heat exchanger) 18 for condensing water vapor in an exhaust gas discharged from the fuel cell module 12 and supplying the condensed water to the water container 16.

An ion exchanger apparatus (e.g., ion filter) 20 for removing impurities in the water supplied from the condenser 18 is provided in the water container 16. The water supply apparatus 14 is provided below the water container 16, downstream of the water container 16. The dimension of the water container 16 in a vertical direction (container length H) is larger than the dimension of the water container 16 in a lateral direction (container diameter D) (H>D). The diameter D is a diameter of a circle having an area equal to the cross sectional area of the water container 16. The ion exchanger apparatus 20 is placed at a lower end in the water container 16.

A pressure regulator 22 is provided between the water supply apparatus 14 and the fuel cell module 12, for absorbing pulsation of the water supply apparatus 14, and absorbing pressure changes in the fuel cell module 12. An electric conductivity meter 24 and a flow meter 26 are provided between the water container 16 and the water supply apparatus 14, or between the pressure regulator 22 and the fuel cell module 12.

Figure 2:
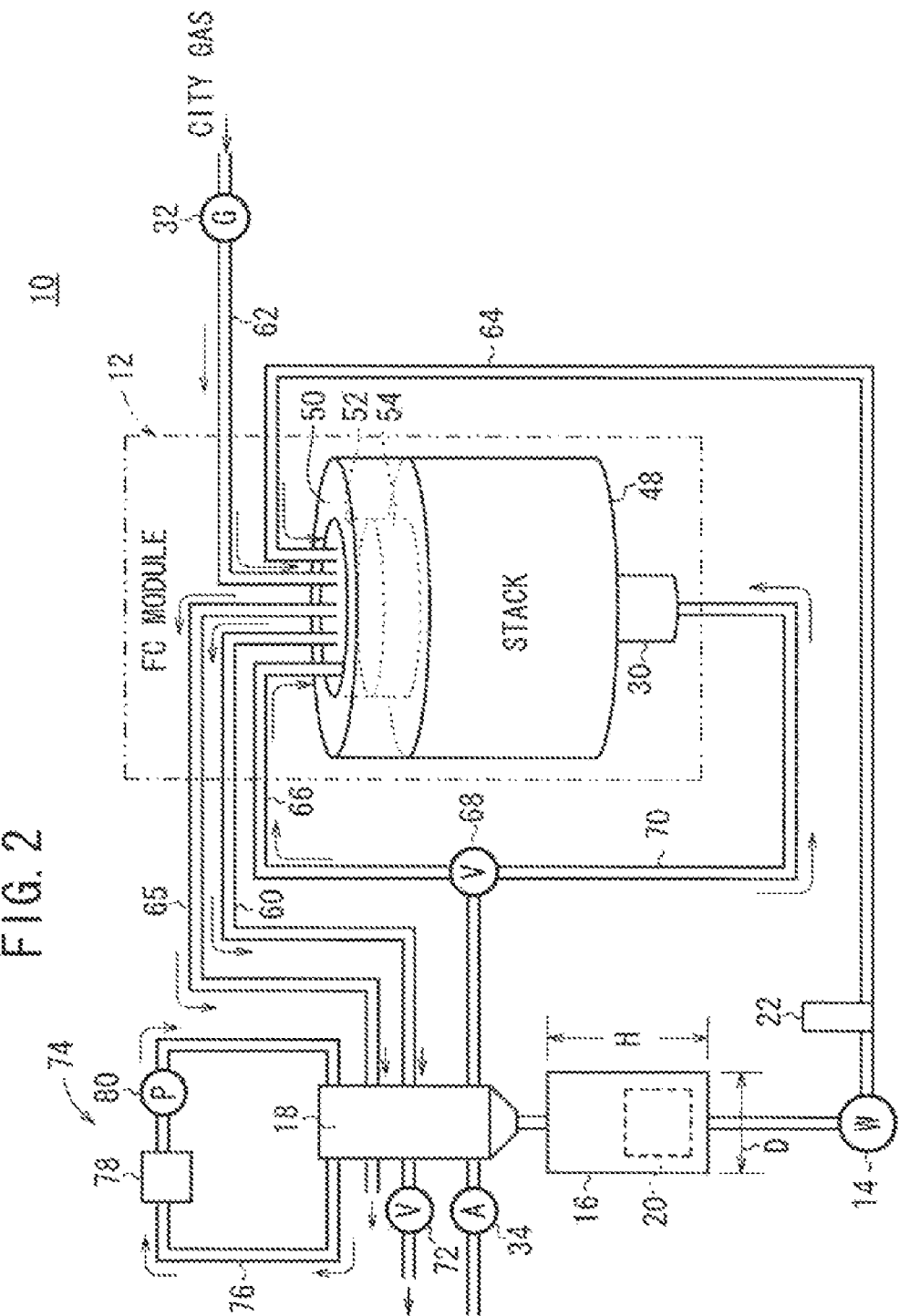
FIG. 2 is a diagram schematically showing structure of a mechanical circuit of the fuel cell system.
Figure 3:
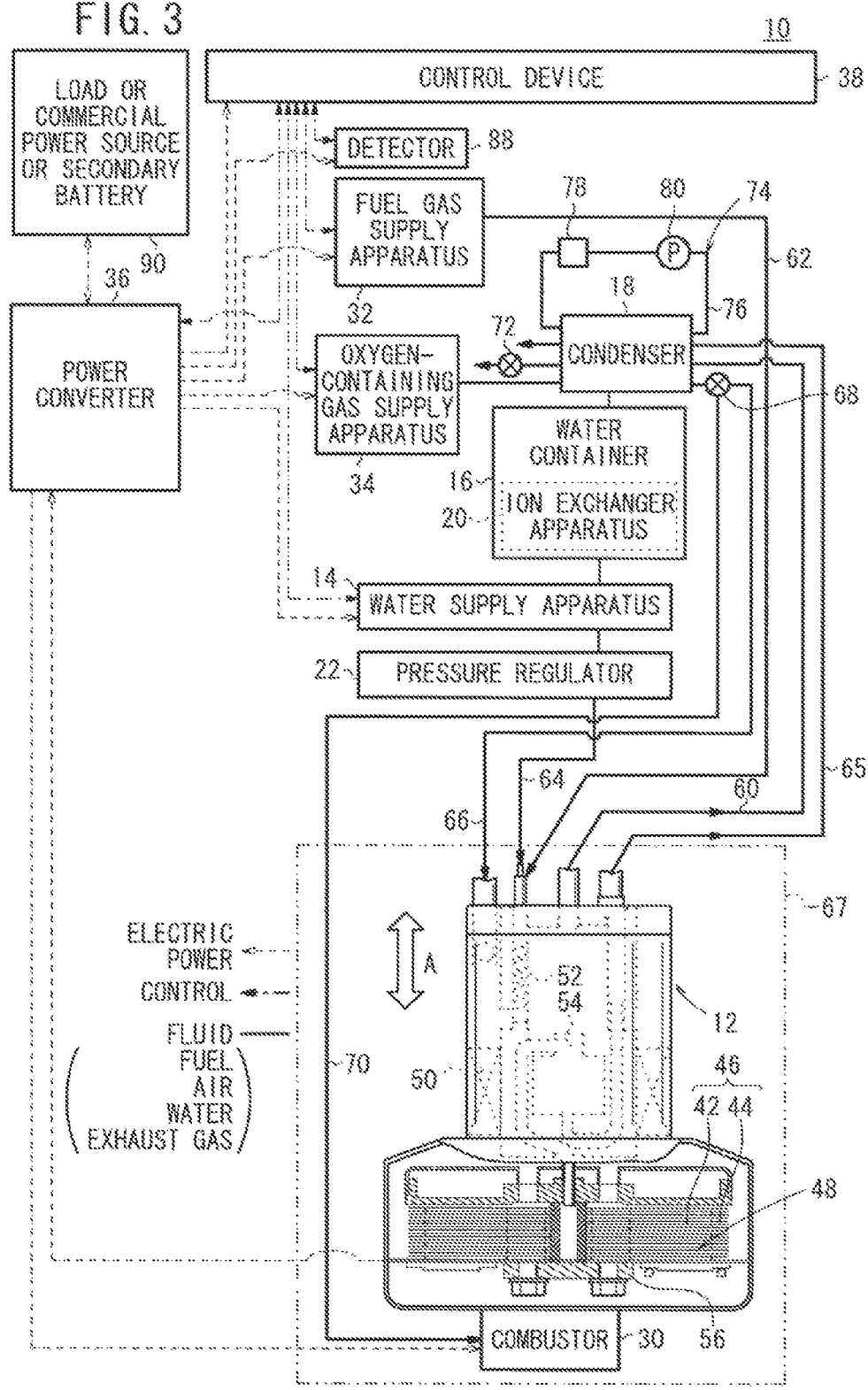
FIG. 3 is a circuit diagram showing the fuel cell system.

Specifically, as shown in FIGS. 2 and 3, the fuel cell system 10 includes the fuel cell module 12, a combustor (e.g., torch heater) 30 for raising the temperature of the fuel cell module 12, a fuel gas supply apparatus (including a fuel gas pump) 32 for supplying a raw fuel (e.g., city gas) to the fuel cell module 12, an oxygen-containing gas supply apparatus (including an air pump) 34 for supplying the oxygen-containing gas to the fuel cell module 12, the water supply apparatus 14, the water container 16, the condenser 18, and a power converter 36 for converting direct electrical energy generated in the fuel cell module 12 into electrical energy according to the requirement specification, and a control device 38 for controlling the amount of electrical energy generated in the fuel cell module 12. The fuel cell module 12, the combustor 30, the fuel gas supply apparatus 32, the oxygen-containing gas supply apparatus 34, the water supply apparatus 14, the water container 16, the condenser 18, the power converter 36, and the control device 38 are placed in a single casing (or a plurality of casings) 40 (see FIGS. 4 and 5).

The fuel cell module 12 includes a fuel cell stack 48 formed by stacking a plurality of solid oxide fuel cells 46 in a vertical direction (see FIG. 3). The fuel cells 46 are formed by stacking electrolyte electrode assemblies 42 and separators 44. Though not shown, each of the electrolyte electrode assemblies 42 includes a cathode, an anode, and a solid electrolyte (solid oxide) interposed between the cathode and the anode. For example, the electrolyte is made of ion-conductive solid oxide such as stabilized zirconia.

Figure 5:
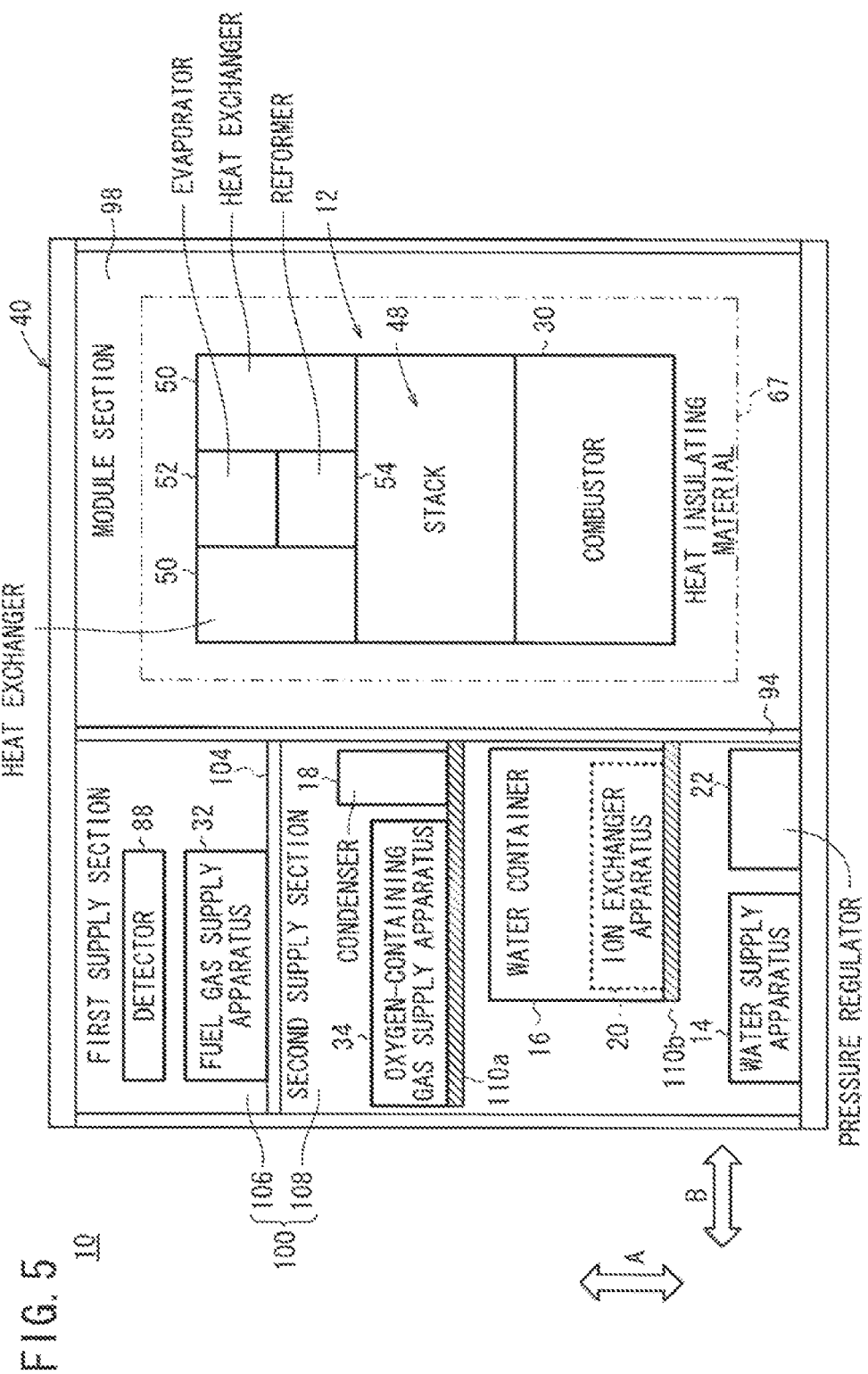
FIG. 5 is a front view showing the fuel cell system.

As shown in FIG. 5, at an upper end (or at a lower end) of the fuel cell stack 48 in the stacking direction, a heat exchanger 50 for heating the oxygen-containing gas before it is supplied to the fuel cell stack 48, an evaporator 52 for evaporating water to produce a mixed fluid of a reforming raw fuel and water vapor, and a reformer 54 for reforming the mixed fuel to produce a reformed gas are provided.

At a lower end (or at an upper end) of the fuel cell stack 48 in the stacking direction, a load applying mechanism 56 for applying a tightening load to the fuel cells 46 of the fuel cell stack 48 in the stacking direction indicated by the arrow A is provided (see FIG. 3). The combustor 30 is provided below the load applying mechanism 56.

The reformer 54 is a preliminary reformer for reforming higher hydrocarbon ($C_{2+}$) such as ethane ($C_2H_6$), propane ($C_3H_8$), and butane ($C_4H_{10}$) in the city gas (raw fuel) into a fuel gas chiefly containing methane ($CH_4$) by steam reforming. The operating temperature of the reformer 54 is several hundred degrees Celsius.

The operating temperature of the fuel cell 46 is high, at several hundred degrees Celsius. In the electrolyte electrode assembly 42, methane in the fuel gas is reformed to obtain hydrogen, and the hydrogen is supplied to the anode.

As shown in FIG. 3, in the heat exchanger 50, a partially consumed reactant gas discharged from the fuel cell stack 48 (hereinafter also referred to as the exhaust gas or the combustion exhaust gas) and the air as a heated medium (heated fluid) flow in a counterflow manner for heat exchange. The exhaust gas after heat exchange is discharged to an exhaust pipe 60, and the air after heat exchange is supplied to the fuel cell stack 48 as an oxygen-containing gas.

A dual pipe is connected to the evaporator 52, and a raw fuel channel 62 and a water channel (water pipe) 64 are formed in the dual pipe. The outlet of the evaporator 52 is connected to the inlet of the reformer 54. The outlet of the reformer 54 is connected to a fuel gas supply passage (not shown) extending through the fuel cell stack 48. A main exhaust pipe 65 is provided for discharging the exhaust gas supplied to the evaporator 52. The fuel cell module 12 and the combustor 30 are surrounded by heat insulating material 67.

The fuel gas supply apparatus 32 is connected to the raw fuel channel 62. The oxygen-containing gas supply apparatus 34 is connected to an air supply pipe 66. A switching valve 68 is provided in a middle of the air supply pipe 66. The switching valve 68 is connected to an air branch channel 70, and the air branch channel 70 is connected to the combustor 30. For example, the combustor 30 includes a torch heater, and the air and electrical current are supplied to the combustor 30.

As shown in FIGS. 2 and 3, the exhaust pipe 60 and the main exhaust pipe 65 are connected to the condenser 18. A flow rate regulator valve 72 is provided in the exhaust pipe 60, near the outlet of the condenser 18, for regulating the flow rate of the exhaust gas supplied to the reformer 54. As the flow rate regulator valve 72, for example, an open/close valve, or a throttle valve having an adjustable opening is adopted.

A hot water mechanism 74 is connected to the condenser 18. The hot water mechanism 74 has a water circulation channel 76 for circulating water (coolant medium) heated using the exhaust gas supplied to the exhaust pipe 60 and/or the main exhaust pipe 65 as the heat medium. A hot water tank 78 and a pump 80 are provided in the water circulation channel 76.

Figure 6:
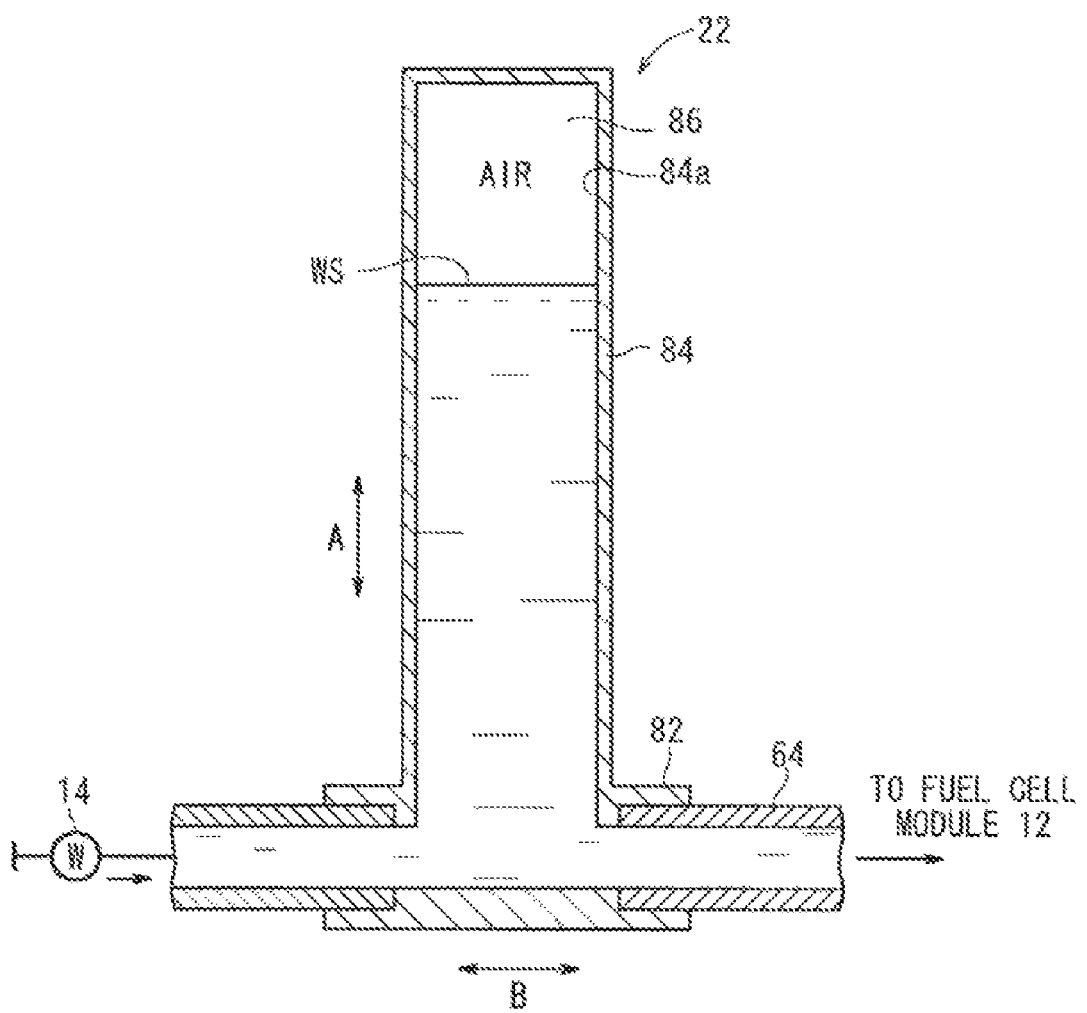
FIG. 6 is a cross sectional view showing a pressure regulator of the fuel cell system.

As shown in FIG. 6, the pressure regulator 22 includes a joint portion 82 connected to the water channel 64. A cylindrical portion 84 extends from the joint portion 82 upwardly, and an upper end of the cylindrical portion 84 is closed. A pressure regulator chamber 86 is formed by an inner wall 84a of the cylindrical portion 84. This pressure regulator chamber 86 should contain fluid other than water, specifically, a insoluble gas or liquid that can be compressed, lighter than water, and cannot be significantly influenced by heat, such as the air or hydrogen.

The water surface WS as the interface between the water and air moves vertically along the inner wall 84a in the direction indicated by the arrow A. The pressure regulator 22 is provided above the lowermost position of the water channel 64. In the pressure regulator chamber 86, the air is present above the water.

As shown in FIG. 3, the fuel gas supply apparatus 32, the oxygen-containing gas supply apparatus 34, and the water supply apparatus 14 are controlled by the control device 38. A detector 88 for detecting the fuel gas is electrically connected to the control device 38. For example, a commercial power source 90 (or load, secondary battery, or the like) is connected to the power converter 36.

Figure 4:
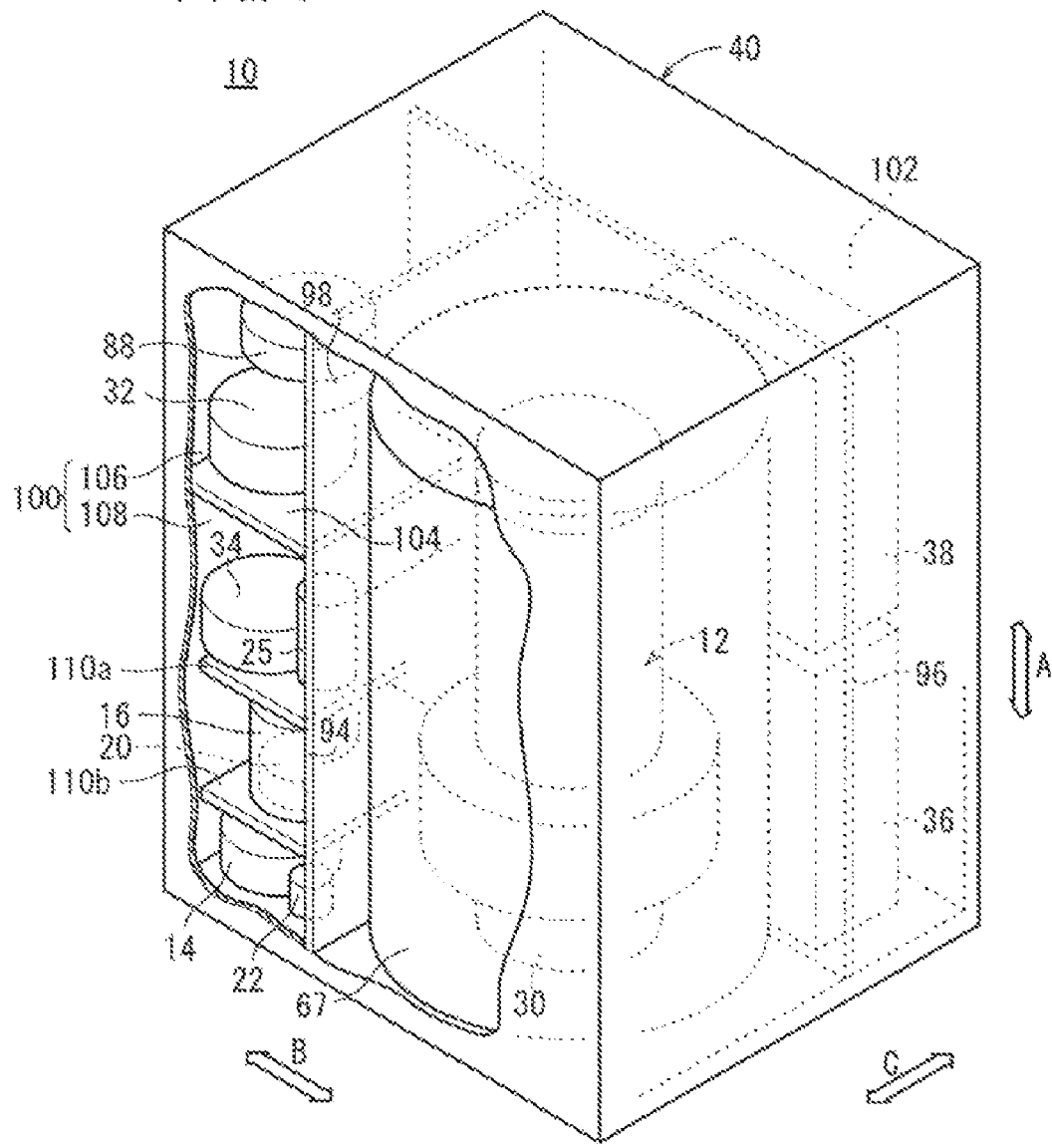
FIG. 4 is a perspective view showing the fuel cell system.

As shown in FIGS. 4 and 5, the casing 40 has a rectangular shape as a whole. In the casing 40, a first vertical partition plate 94 and a second vertical partition plate 96 are provided. The first vertical partition plate 94 divides the space in the casing 40 in a horizontal direction indicated by the arrow B. The second vertical partition plate 96 divides the space in the casing 40 in a direction indicated by the arrow C (in a horizontal direction intersecting with the direction indicated by the arrow B).

A module section 98 has a rectangular shape (polygonal shape) in a plan view, and includes the first vertical partition plate 94 as a first side surface and the second vertical partition plate 96 as a second side surface on both sides of one corner. A fluid supply section 100 is provided on the first vertical partition plate 94 side, and an electrical equipment section 102 is provided on the second vertical partition plate 96 side. Thus, the fluid supply section 100 and the electrical equipment section 102 form an outer wall of the casing 40.

The fuel cell module 12 and the combustor 30 are disposed in the module section 98. The fuel cell module 12 is provided above the combustor 30. The fuel cell module 12 and the combustor 30 are surrounded by the heat insulating material 67. The power converter 36 and the control device 38 are placed in the electrical equipment section 102. The volume of the electrical equipment section 102 is larger than the volume of the fluid supply section 100. Alternatively, the volume of the fluid supply section 100 may be larger than the volume of the electrical equipment section 102.

As shown in FIG. 5, the space in the fluid supply section 100 is divided vertically into two sections, a first supply section 106 and a second supply section 108 by a lateral partition plate 104. The fuel gas supply apparatus 32 and the detector 88 are placed in the first supply section 106, and the detector 88 is provided above the fuel gas supply apparatus 32.

The oxygen-containing gas supply apparatus 34, the condenser 18, the water container 16, and the pressure regulator 22 are placed in the second supply section 108. The water supply apparatus 14 and the pressure regulator 22 are provided at the lowermost position of the fluid supply section 100. The water container 16 is provided below the condenser 18, downstream of the condenser 18. The water supply apparatus 14 is provided below the water container 16, downstream of the water container 16. The pressure regulator 22 is provided downstream of the water supply apparatus 14.

The oxygen-containing gas supply apparatus 34 and the condenser 18 are fixed on a table 110a in the second supply section 108, and the water container 16 is fixed on a table 110b. The condenser 18 is provided above the water container 16, upstream of the water container 16.

Operation of the fuel cell system 10 will be described below.

As shown in FIG. 3, by operation of the fuel gas supply apparatus 32, for example, a raw fuel such as the city gas (including $CH_4$, $C_2H_6$, $C_3H_8$, $C_4H_{10}$) is supplied to the raw fuel channel 62. Further, by operation of the water supply apparatus 14, water is supplied to the water channel 64, and by operation of the oxygen-containing gas supply apparatus 34, the oxygen-containing gas such as air is supplied to the air supply pipe 66.

In the evaporator 52, the raw fuel flowing through the raw fuel channel 62 is mixed with the water vapor, and a mixed fuel is obtained. The mixed fuel is supplied to the inlet of the reformer 54. The mixed fuel undergoes steam reforming in the reformer 54. Thus, hydrocarbon of $C_{2+}$ is removed (reformed), and a reformed gas chiefly containing methane is obtained. The reformed gas flows through the outlet of the reformer 54, and the reformed gas is supplied to the fuel cell stack 48. Thus, the methane in the reformed gas is reformed, and the hydrogen gas is obtained. The fuel gas chiefly containing the hydrogen gas is supplied to the anodes (not shown).

The air supplied from the air supply pipe 66 to the heat exchanger 50 moves along the heat exchanger 50, and heated to a predetermined temperature by heat exchange with the exhaust gas as described later. The air heated by the heat exchanger 50 is supplied to the fuel cell stack 48, and the air is supplied to the cathodes (not shown).

Thus, in each of the electrolyte electrode assemblies 42, by electrochemical reactions of the fuel gas and the air, power generation is performed. The hot exhaust gas (several hundred ° C.) discharged to the outer circumferential region of each of the electrolyte electrode assemblies 42 flows through the heat exchanger 50, and heat exchange with the air is carried out. The air is heated to a predetermined temperature, and the temperature of the exhaust gas is decreased.

The exhaust gas evaporates the water passing through the water channel 64. The exhaust gas that passed through the evaporator 52 is supplied to the condenser 18 through the main exhaust pipe 65. The water vapor is condensed, and the exhaust gas components are discharged to the outside. In the hot water mechanism 74, when demand for hot water is small, the pump 80 is stopped. Further, the oxygen-containing gas supplied to the condenser 18 may be heated using the hot water.

In the condenser 18, the water is obtained by condensing the water vapor. This water is supplied into the water container 16 placed downstream of the condenser 18. The ion exchanger apparatus 20 is placed in the water container 16, and impurities contained in the water supplied into the water container 16 are removed by the ion exchanger apparatus 20.

Further, by operating the water supply apparatus 14 provided downstream of the water container 16, the water stored in the water container 16 is supplied into the pressure regulator 22. As shown in FIG. 6, since the air is provided in the pressure regulator chamber 86 of the pressure regulator 22, the water surface WS moves along the inner wall 84a by the pressure of the air and the pressure of the supplied water for regulating the pressure. After the pressure is regulated, the water is supplied to the fuel cell module 12 through the water channel 64.

In the first embodiment, the ion exchanger apparatus 20 is provided in the water container 16. The water container 16 and the ion exchanger apparatus 20 are combined together. Therefore, the water container 16 and the ion exchanger apparatus 20 have simple and compact structure as a whole.

Further, since the ion exchanger apparatus 20 is provided in the water container 16, material used for producing the water container 16 itself is not limited. As a result, the material for the water container 16 can be selected freely.

Further, the water supply apparatus 14 is provided below the water container 16 and downstream of the water container 16. In the structure, water is supplied from the water container 16 to the water supply apparatus 14 by the hydraulic head pressure. Therefore, occurrence of air entrainment in the water supply apparatus 14 is prevented as much as possible.

Thus, it is possible to effectively avoid degradation in the performance of the water supply apparatus 14, mixture of the air into the reformer 54, deposition (coking) of carbon material at the electrode, and instability of power generation voltage of the fuel cell module 12.

Further, the ion exchanger apparatus 20 in the water container 16 is provided upstream of the water supply apparatus 14. Therefore, high pressure (water pressure) by the water supply apparatus 14 is not applied to the ion exchanger apparatus 20. Therefore, improvement in the durability and product life of the ion exchanger apparatus 20 is achieved.

Further, the pressure regulator 22 is provided between the water supply apparatus 14 and the fuel cell module 12. Therefore, since pulsation of the water supply apparatus 14 is absorbed by the pressure regulator 22, it is desirable that the present invention is applied to the water supply apparatus 14 having large pulsation. In particular, in the case where a plunger pump (or a piston pump) is used as the water supply apparatus 14, even at the time when water is not pushed out, the water in the pressure regulator 22 can be supplied to the downstream side.

Figure 7:
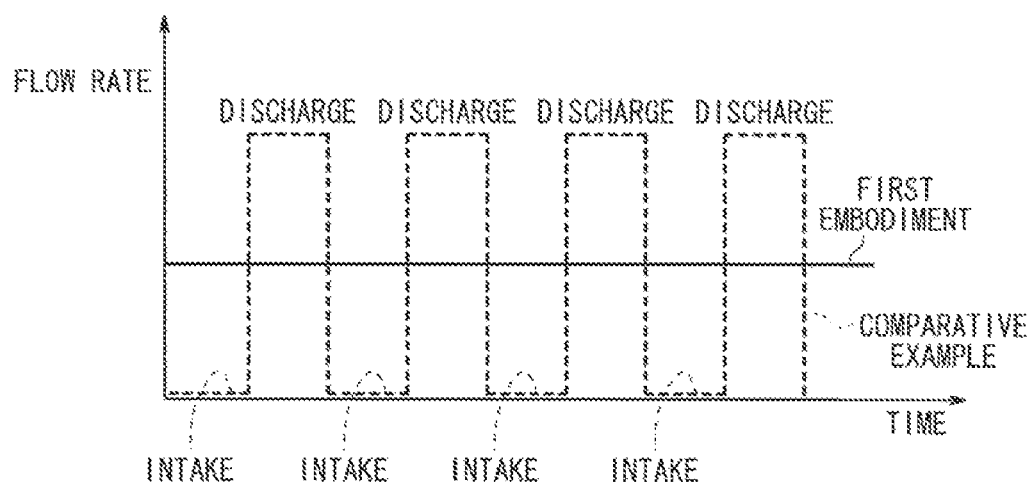
FIG. 7 is a view illustrating the flow rate in each time zone in a case where the pressure regulator is provided and in a case where no pressure regulator is provided.

That is, as shown in FIG. 7, in a comparative example where no pressure regulator is used, by intake and discharge of the pump, the amount of water ejected from the pump changes significantly. In contrast, in the first embodiment, by providing the pressure regulator 22, the change in the amount of water is suppressed suitably, and it becomes possible to supply the water to the fuel cell module 12 stably. Thus, shortage of water vapor supplied to the reformer 54, deposition (coking) of carbon at the electrode, and instability of power generation output in the fuel cell module 12 can be avoided effectively.

Further, the pressure regulator 22 absorbs the change in the pressure of the fuel cell module 12. Therefore, no excessive pressure is applied to the water supply apparatus 14, and improvement in the durability of the water supply apparatus 14 is achieved. Further, at the time when the pressure in the fuel cell module 12 is increased, or when a failure occurs in the water supply apparatus 14, the influence due to the backflow of the fuel gas from the fuel cell module 12, e.g., gas leakage can be suppressed.

Further, as shown in FIG. 6, at the pressure regulator 22, water and fluid other than the water, e.g., the air is provided in the pressure regulator chamber 86. The water surface WS as the interface between the water and the air moves along the inner wall 84*a* due to the pressure difference between the water and the air. Thus, with simple and economical structure, desired power generation function of the pressure regulator 22 is achieved.

Further, the pressure regulator 22 is provided above the lowermost position of the water channel 64 connecting the water supply apparatus 14 and the fuel cell module 12 (see FIGS. 2 and 6). Thus, with simple structure, it is possible to suitably prevent the air in the pressure regulator 22 from flowing to the outside (leakage) In this case, the air is provided above the water. Thus, pressure regulation by the air can be achieved more effectively.

Further, as shown in FIG. 2, the dimension in the vertical direction (container length H) is larger than the dimension in the lateral direction (container diameter D). In the structure, it becomes possible to further increase the hydraulic head pressure from the water container 16 to the water supply apparatus 14 on the downstream side. Therefore, occurrence of air entrainment in the water supply apparatus 14 is prevented as much as possible. It is possible to effectively avoid degradation in the performance of the water supply apparatus 14, mixture of the air into the reformer 54, deposition (coking) of carbon material at the electrode, and instability of power generation voltage of the fuel cell module 12.

Further, the ion exchanger apparatus 20 is provided at the lower end in the water container 16. Thus, mixture of the air bubbles into the ion exchanger apparatus 20 is suppressed using the hydraulic head pressure.

Further, even if foreign material such as silica is mixed into the water container 16, it is possible to suppress mixture of the foreign material into the fuel cell module 12 by the ion exchanger apparatus 20.

Further, the fuel cell module 12 includes the fuel cell stack 48, the heat exchanger 50, the evaporator 52, and the reformer 54. In particular, the fuel cell module 12 can be used optimally for performing steam reforming, and suitable advantages can be obtained.

Further, the fuel cell module 12 is particularly advantageous when it is a solid oxide fuel cell (SOFC) module used for a high temperature fuel cell system. Further, instead of the solid oxide fuel cell module, the present invention is also suitably applicable to the other types of high temperature fuel cell modules and medium temperature fuel cell modules. For example, Molten-carbonate fuel cells (MCFC), phosphoric acid fuel cells (PAFC), and hydrogen membrane fuel cells (HMFC) can be adopted suitably.

Figure 8:
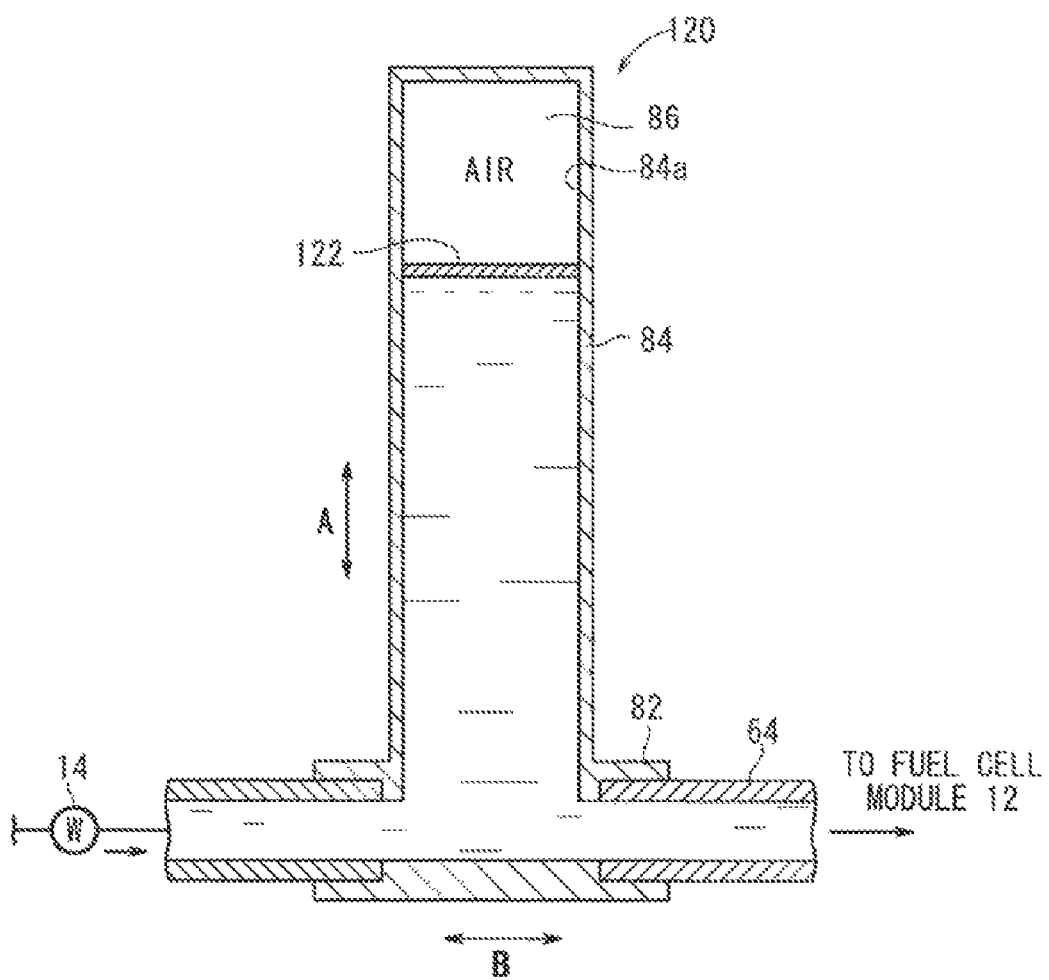
FIG. 8 is a cross sectional view showing a pressure regulator of a fuel cell system according to a second embodiment of the present invention.
Figure 9:
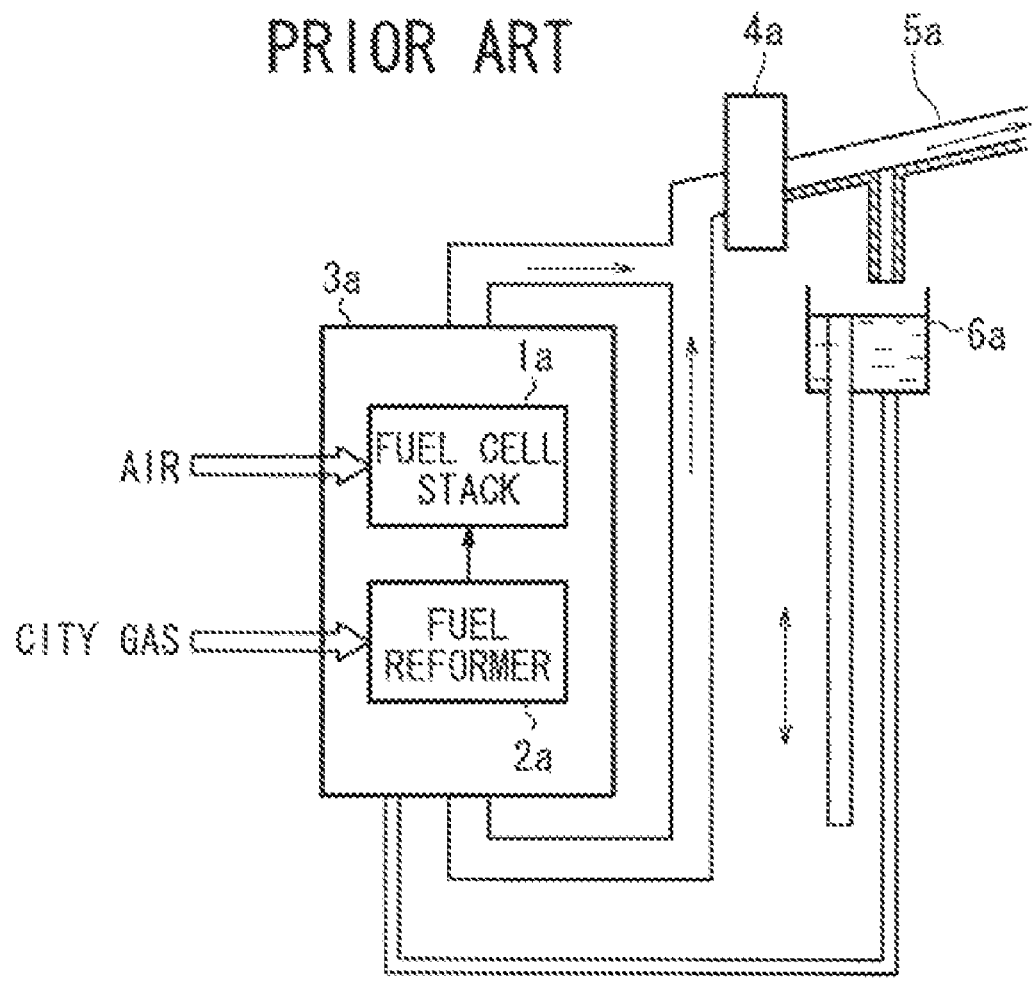
FIG. 9 is a water collection apparatus of a fuel cell power generator apparatus disclosed in Japanese Laid-Open Patent Publication No. 2006-236598.
Figure 10:
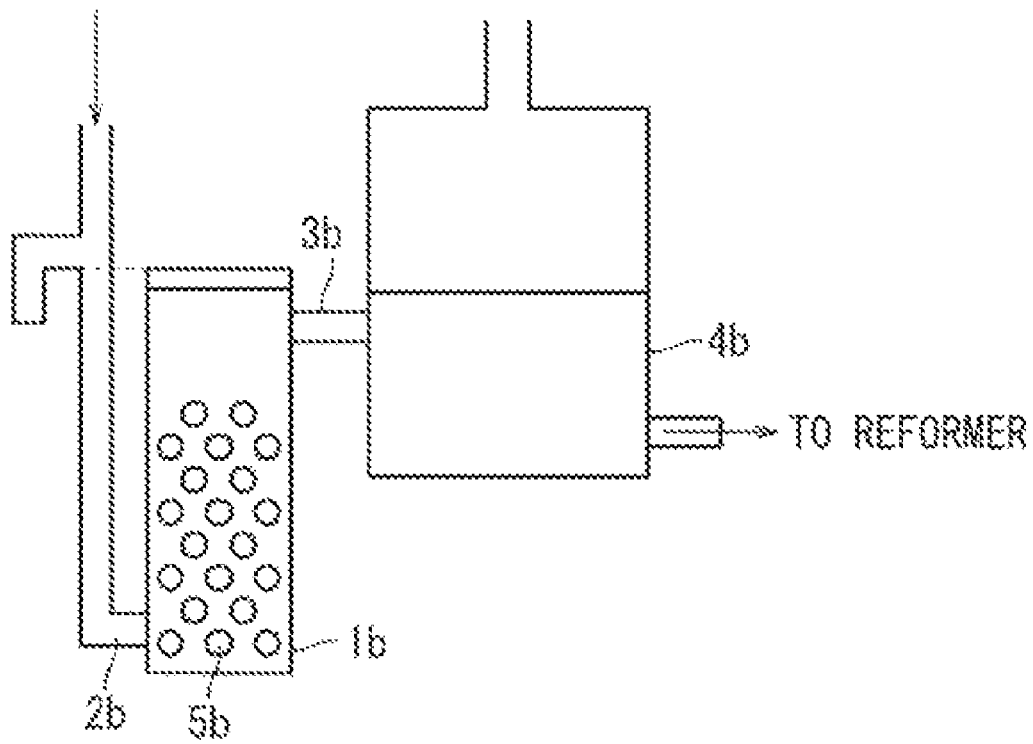
FIG. 10 is a view showing a fuel cell apparatus disclosed in Japanese Laid-Open Patent Publication No. 2008-300058.
Figure 11:
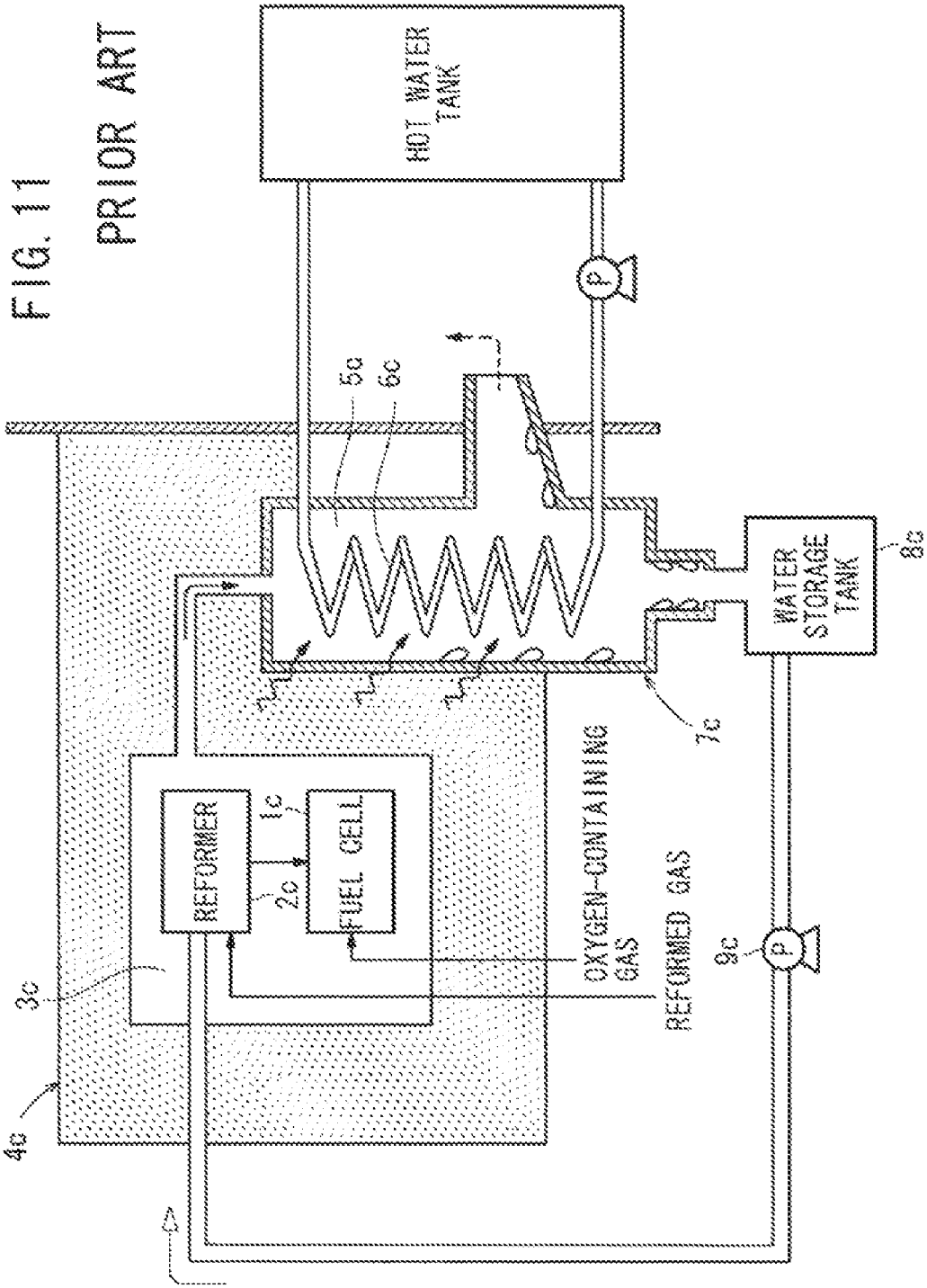
FIG. 11 is a view showing a waste heat collection system disclosed in Japanese Laid-Open Patent Publication No. 2007-234374.

FIG. 8 is a cross sectional view showing a pressure regulator 120 of a fuel cell system according to a second embodiment of the present invention.

The constituent elements that are identical to those of the fuel cell system 10 according to the first embodiment are labeled with the same reference numerals, and description thereof will be omitted.

The pressure regulator 120 is provided in the pressure regulator chamber 86, and includes a partition wall member 122 for dividing water and the air. The partition wall member 122 is slidable along an inner wall 84*a* by the pressure difference between the water and the air.

Thus, in the second embodiment, the orientation of the pressure regulator chamber 86 can be determined arbitrarily. The layout of providing the pressure regulator 120 can be determined freely. Further, the fluid in the pressure regulator chamber 86 is not limited. For example, it is not required that the fluid is insoluble, or the fluid is lighter than water. Therefore, fluid in the pressure regulator chamber 86 can be determined freely.

The invention claimed is:

1. A fuel cell system comprising:
a fuel cell module for generating electrical energy by electrochemical reactions of a fuel gas and an oxygen-containing gas;
a water supply apparatus for supplying water to the fuel cell module;
a water container for supplying water to the water supply apparatus;
a condenser for condensing water vapor in an exhaust gas discharged from the fuel cell module, and supplying the condensed water to the water container,
wherein the water container contains an ion exchanger apparatus for removing impurities in the water supplied from the condenser;
the water supply apparatus is provided below the water container, and downstream of the water container; and
a pressure regulator is provided between the water supply apparatus and the fuel cell module, for absorbing pulsation of the water supply apparatus and absorbing pressure changes in the fuel cell module.

2. The fuel cell system according to claim 1, wherein water and fluid other than the water are provided in the pressure regulator, and the pressure regulator has a pressure regulator chamber where an interface surface between the water and the fluid moves along an inner surface of the pressure regulator chamber by the pressure difference between the water and the fluid.

3. The fuel cell system according to claim 2, wherein the pressure regulator includes a partition wall member provided in the pressure regulator chamber for dividing the water and the fluid, and the partition wall member is slidable along the inner surface by the pressure difference between the water and the fluid.

4. The fuel cell system according to claim 1, wherein the pressure regulator is provided above a lowermost position of a water pipe connecting the water supply apparatus and the fuel cell module.

5. The fuel cell system according to claim 2, wherein the fluid is provided above the water.

6. The fuel cell system according to claim 1, wherein the dimension of the water container in a vertical direction is larger than the dimension of the water container in a lateral direction.

7. The fuel cell system according to claim 1, wherein the ion exchanger apparatus is provided on a lower end side in the water container.

8. The fuel cell system according to claim 1, wherein the fuel cell module comprises:
a fuel cell stack formed by stacking a plurality of fuel cells, the fuel cells each being formed by stacking an electrolyte electrode assembly and a separator, the electrolyte electrode assembly including an anode, a cathode, and at least an electrolyte interposed between the anode and the cathode;
a heat exchanger for heating the oxygen-containing gas before the oxygen-containing gas is supplied to the fuel cell stack;
an evaporator for evaporating the water to produce a mixed fuel of a raw fuel chiefly containing hydrocarbon and water vapor; and
a reformer for reforming the mixed fuel to produce a reformed gas.

9. The fuel cell system according to claim 1, wherein the fuel cell module is a solid oxide fuel cell module.

* * * * *